United States Patent [19]

Barratt et al.

[11] Patent Number: 5,372,631
[45] Date of Patent: Dec. 13, 1994

[54] REDUCTION OF SILVER HALIDES IN PHOTOEMULSION USING SODIUM BOROHYDRIDE AND REDUCING SUGARS

[75] Inventors: David A. Barratt, Chelmsford, Mass.; John Schwartz, Jr., Spartanburg, S.C.

[73] Assignee: Morton International, Inc., Chicago, Ill.

[21] Appl. No.: 152,542

[22] Filed: Nov. 12, 1993

[51] Int. Cl.⁵ ............................................. C22B 11/06
[52] U.S. Cl. ............................................. 75/713
[58] Field of Search ........................................ 75/713

[56] References Cited

U.S. PATENT DOCUMENTS 2,503,104  4/1950  Farber ..................... 75/713
3,082,079  3/1963  Bulloch .................... 75/713

*Primary Examiner*—Peter D. Rosenberg
*Attorney, Agent, or Firm*—Wayne E. Nacker; Gerald K. White

[57] ABSTRACT

Photoemulsion is reduced with a combination of reducing sugar and sodium borohydride, resulting in increased silver recovery.

8 Claims, No Drawings

REDUCTION OF SILVER HALIDES IN PHOTOEMULSION USING SODIUM BOROHYDRIDE AND REDUCING SUGARS

The present invention is directed to silver recovery from photoemulsions.

BACKGROUND OF THE INVENTION

For both economic and environmental reasons, silver is recovered from photoemulsions. The photoemulsion may be from exposed and developed film, undeveloped film (green film), or unused emulsion, e.g., emulsion which does not meet specifications. The silver exists in the emulsion primarily as silver halide. The emulsion also comprises gelatin which encapsulates silver halide particulates and generally a latex, such as acrylic latex or styrene/butadiene latex. Photoemulsions are aqueous; water comprising upwards of 80% by weight.

Silver recovery involves reduction of the silver in the silver halide to its zero-valance, metallic state to produce a silver-containing sludge, drying and burning the sludge in a kiln to remove organic components, and successive melting/purification of the metallic silver content obtained thereby.

The present invention is directed to reduction of the silver halide content by the combination of sodium borohydride (NaBH$_4$) (SBH) and reducing sugar, which combination achieves a greater recovery of silver than reduction obtainable with either reducing agent alone. Reduction of silver halide using either reducing sugar or SBH alone are known. Reducing sugars are those sugars that give positive oxidation tests in Tollens' or Benedicts' solutions and are generally mono- or di- saccharides capable of reducing copper or silver salts in alkaline solutions. Also included as reducing sugars are polysaccharides which hydrolyze to yield polyhydroxy aldehydes and ketones. Generally, all carbohydrates containing a hemiacetal group or hemiketal group are classified as reducing sugars. Common examples of reducing sugars are sucrose, fructose, and glucose.

Sodium borohydride reduces sugar halide according to the formula:

$$8AgX + NaBH_4 + 2 H_2O \rightarrow NaBO_2 + 8HX + 8Ag^0,$$

where X is a halide. Thus, one mole of SBH reduces 8 moles of silver halide. SBH in aqueous solution is typically at about 12% by weight in about 40% by weight NaOH (e.g., VenMet$^R$ solution sold by Morton International, Inc.); stoichiometrically, about 8 parts by weight of silver metal are reduced by 1 part by weight of 12% SBH solution.

There are disadvantages with reduction by either reducing sugar alone or sodium borohydride alone which limit silver recovery. While either will reduce a major portion of the silver halide, it is to be appreciated that in silver recovery, each additional percent recovery is significant from economic, environmental and apparatus standpoints. Reduction by reducing sugar is highly pH-dependent, being optimal at a pH of about 12. However, due to hydrogen halide being produced by the silver reduction, it is difficult to maintain such a high pH. Consequently, reduction of silver halide by reducing sugar may be less than desired.

SBH efficiently reduces silver halide that is freed from emulsion; however, it is found that SBH does not reduce silver halide which remains emulsified, e.g., in gelatin. Applicants have found, for example, that a silver halide reduction with SBH may produce a reduced sludge which titrates to a very low silver halide content, but that the sludge, when roasted, takes a heavy corrosive toll on the kiln. This is attributed to residual silver halide content which remains encapsulated in the latex or gelatin.

One way to break the emulsion is to dry the emulsion to a powder and then reconstitute the silver halide in water prior to adding the silver halide. Because a photoemulsion is largely water, i.e., upward of about 80% by weight, substantial energy is required to produce the powder. In reconstituting, it is typical to use large volumes of water so as to provide a viscosity consistent with standard mixing apparatus. The present invention is directed to providing enhanced silver halide reduction from photoemulsion which need be neither dried nor reconstituted and to which a minimal amount of water is added.

SUMMARY OF THE INVENTION

In accordance with the present invention, it is found that the combination of reducing sugar and sodium borohydride as reducing agents enhance silver recovery from photoemulsions. Preferably, reducing sugar is added to photoemulsion, which need not be dried and reconstituted but may be in its raw form; alkali is added to raise the pH to that pH consistent with efficient reducing sugar reduction of silver halide; and a caustic solution of sodium borohydride is then added and mixed with the photoemulsion to complete reduction of silver halide, thereby producing a silver-containing sludge.

DETAILED DESCRIPTION OF CERTAIN PREFERRED EMBODIMENTS

It is found that the combination of reducing sugar and SBH enhances silver recovery by several percent over use of either reducing agent alone. The SBH is added as a highly caustic, stabilized solution, helping to maintain optimal pH in the reaction mixture for reducing sugar reduction. It appears that the reducing sugar acts as a plasticizer for the gelatin and latex, helping to break any emulsion that retains residual silver halide particles.

The process of the present invention can be used on raw photoemulsion which is neither dried nor substantially diluted. Some water is added as a solvent for SBH and perhaps the reducing sugar and other additives; however, the total volume of water added does not exceed the volume of water already present in the photoemulsion. Accordingly, there need be no energy expenditure in drying the photoemulsion to break the emulsion and free the silver halide. Also, minimal addition of water minimizes the energy expenditure in the dry/roast process that drives off/decomposes organic matter.

The relative amounts of reducing sugar and sodium borohydride may vary over a wide range, provided that sufficient reducing agent be present in at least a stoichiometric amount relative to the silver halide content of the photoemulsion. As some sugar may be decomposed in the process and some SBH may hydrolyze, preferably a slight stoichiometric excess of reducing sugar plus SBH is provided. As the silver content of the emulsion being processed may vary over a wide range, e.g. from about 1 to about 45 wt. % of emulsion solids, typically between about 6 and about 8 wt. % of the emulsion solids, the amount of reducing agents added will depend upon the emulsion being processed. The silver content is generally predetermined by assay of the emulsion, and the amount of reducing agent needed calculated relative thereto. SBH is typically added at between about 0.2 and about 1.2 times the stoichiometric equivalent of the silver content of the photoemulsion. The balance of the reducing agent is the reducing sugar. On a weight basis, the ratio of reducing sugar to SBH (solid) may range from about 25:1 to about 100:1. The ratio will be selected according to efficiency and economics, SBH being the more efficient reducing agent, but also substantially more expensive than reducing sugar.

It is well known that SBH in aqueous solution is unstable unless stabilized by a high level of caustic. For this reasons, it is highly preferable that SBH be added as a highly caustic, aqueous solution. If the pH dips substantially, SBH will hydrolyze. If SBH and reducing sugar are added together, generated hydrogen halide may cause dips in the pH and consequent hydrolysis of SBH. Thus, in accordance with a preferred aspect of the invention, reducing sugar is added to the photoemulsion; the pH is raised with caustic to at least about 9, preferably about 11; and the caustic solution of SBH is then added, raising the pH of the reaction mixture even higher, preferably to at least about 12.

The reduction may be effected in a batch process, e.g., in a ribbon blender. The photoemulsion (at a generally neutral pH) is added to the blender and the reducing sugar is added with mixing. To bring the pH up to where the reducing sugar efficiently reduces the silver halide, caustic is added, preferably in powder form. The caustic dissolves in the water of the emulsion, not only raising the pH, but raising the temperature of the material through its exothermic solvation. Both reducing sugar reduction and SBH reduction proceed most rapidly at elevated temperature, e.g., the boiling point of the aqueous reaction mixture, and the solvation energy helps bring the material to the boiling point. External heat may be added to elevate the emulsion to the desired temperature. Subsequently, the addition of the SBH solution adds addition solvation heat (as the caustic becomes more dilute) and the additional caustic stabilizes the high pH. Because of the high amount of solvation energy involved and because of the exothermal nature of the reduction reactions, it is preferred that the alkaline aqueous SBH solution be added over a period of time. After SBH addition is complete, mixing continues until silver halide reduction is as complete as is consistent with the process. The heat generated by caustic solvation and silver halide reduction also serves to drive off water from the mixture. What remains after reduction is a black, silver metal-containing sludge from which metallic silver is recovered in accordance with known procedures.

In a preferred aspect of the invention, plasticizer and emulsifier (surfactant) are added at the time or (preferably) prior to reducing sugar addition to assist the release of silver halide from the emulsion. Surfactants may be non-ionic, e.g., ethoxylated alcohols, or ionic, e.g., ethoxylated alcohol phosphates. Surfactants are used at up to about 2 wt. % based upon solids of the photoemulsion, preferably between about 0.4 and about 0.6 wt. %. Plasticizers are used at up to about 0.5 wt. % based upon photoemulsion solids, preferably between about 0.05 and about 0.01 wt. %. A plasticizer found to pe particularly suitable is tetra ethyleneglycol diheptonoate, a $C_6$ fatty acid ester.

The invention will now be described in greater detail by way of specific example.

EXAMPLE 500 grams of emulsion containing about 6.42% Ag as AgX were processed with the following (amounts in grams):

|  | A | B | C |
|---|---|---|---|
| NAOH | 20 | 20 | 20 |
| Dextrose | 35 | 75 | — |
| 5% SBH, 40% NaOH solution | 12.8 | — | 30 |
| Silver recovery | 96% | 84% | 88% |

What is claimed is:

1. A method of reducing silver halide in a photoemulsion comprising adding to said emulsion a reducing sugar and sodium borohydride at a weight ratio from about 25:1 to about 100:1, the total amount of said reducing sugar and said sodium borohydride being at least about the stoichiometric equivalent of the silver halide in said photoemulsion.

2. A method in accordance with claim 1, wherein said reducing sugar is added to photoemulsion, caustic is then added to raise the pH to at least about 9, and then said sodium borohydride is added as an alkali-stabilized aqueous solution.

3. A method in accordance with claim 2 wherein said pH is raised to at least about 11 prior to addition of said alkali-stabilized sodium borohydride solution.

4. A method in accordance with claim 2 wherein prior to or along with said reducing sugar, plasticizer is added at a level of between about 0.05 and about 0.5 wt. % relative to solids of said photoemulsion.

5. A method in accordance with claim 2 wherein prior to or along with said reducing sugar, surfactant is added at a level of between about 0.4 and about 2 wt. % relative to solids of said photo emulsion.

6. A method in accordance with claim 5 wherein prior to or along with said reducing sugar, plasticizer is added at a level of between about 0.05 and about 0.5 wt. % relative to solids of said photo emulsion.

7. A method in accordance with claim 2 wherein prior to or along with said reducing sugar, heat is added to the level of between about 140° F. and about 200° F.

8. A method in accordance with claim 5 wherein prior to or along with said reducing sugar, heat is added to the level of between about 140° F. and about 200° F.

* * * * *